United States Patent
Sato et al.

(10) Patent No.: US 11,783,999 B2
(45) Date of Patent: Oct. 10, 2023

(54) MULTILAYER COIL ARRAY

(71) Applicant: Murata Manufacturing Co., Ltd., Kyoto-fu (JP)

(72) Inventors: Mitsuhiro Sato, Nagaokakyo (JP); Ryohei Kawabata, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 672 days.

(21) Appl. No.: 16/592,596

(22) Filed: Oct. 3, 2019

(65) Prior Publication Data
US 2020/0111609 A1 Apr. 9, 2020

(30) Foreign Application Priority Data
Oct. 5, 2018 (JP) .................................. 2018-190195

(51) Int. Cl.
*H01F 27/28* (2006.01)
*H01F 41/04* (2006.01)
(Continued)

(52) U.S. Cl.
CPC ........... *H01F 41/046* (2013.01); *C04B 35/26* (2013.01); *H01F 17/0013* (2013.01);
(Continued)

(58) Field of Classification Search
CPC .... H01F 41/046; H01F 17/0013; H01F 17/04; H01F 27/255; H01F 27/2847;
(Continued)

(56) References Cited

U.S. PATENT DOCUMENTS
2011/0286144 A1 11/2011 Ikriannikov
2016/0078997 A1 3/2016 Son et al.
(Continued)

FOREIGN PATENT DOCUMENTS
CN 101911221 A 12/2010
JP 2001-110638 A 4/2001
(Continued)

OTHER PUBLICATIONS

An Office Action; "Notice of Reasons for Refusal," mailed by the Japanese Patent Office dated Mar. 23, 2021, which corresponds to Japanese Patent Application No. 2018-190195 and is related to U.S. Appl. No. 16/592,596 with English language translation.

*Primary Examiner* — Tszfung J Chan
*Assistant Examiner* — Kazi S Hossain
(74) *Attorney, Agent, or Firm* — Studebaker & Brackett PC

(57) ABSTRACT

A multilayer coil array includes an element body including a magnetic layer; first and second built-in coils; and first to fourth outer electrodes connected to the first and second coils. A non-magnetic layer is provided between the first and second coils. The first and second coils are each formed by a plurality of coil conductors being connected to each other. At least one out of a coil conductor of the first coil that is closest to the second coil among the plurality of coil conductors of the first coil and a coil conductor of the second coil that is closest to the first coil among the plurality of coil conductors of the second coil contacts the non-magnetic layer. The length of a coil conductor layer that contacts the non-magnetic layer of the coil conductor contacting the non-magnetic layer is different from the length of the other coil conductor layers.

6 Claims, 12 Drawing Sheets

(51) Int. Cl.
*H01F 17/00* (2006.01)
*H01F 27/29* (2006.01)
*H01F 27/255* (2006.01)
*C04B 35/26* (2006.01)
*H01F 17/04* (2006.01)

(52) U.S. Cl.
CPC ........... *H01F 17/04* (2013.01); *H01F 27/255* (2013.01); *H01F 27/2847* (2013.01); *H01F 27/292* (2013.01); *C04B 2235/3281* (2013.01); *C04B 2235/5436* (2013.01); *C04B 2235/5445* (2013.01); *H01F 2017/0066* (2013.01)

(58) Field of Classification Search
CPC ........... H01F 27/292; H01F 2017/0066; H01F 41/043; H01F 2027/2809; H01F 27/2804; H01F 27/323; C04B 35/26; C04B 2235/3281; C04B 2235/5436; C04B 2235/5445; C04B 2235/3284; C04B 35/265
USPC .................. 336/199, 200, 232, 198, 192
See application file for complete search history.

(56) References Cited

U.S. PATENT DOCUMENTS

| | | | |
|---|---|---|---|
| 2016/0099102 A1* | 4/2016 | Matsunaga | H01F 17/0013 336/105 |
| 2017/0092414 A1* | 3/2017 | Ishikawa | H01F 27/292 |
| 2017/0345551 A1 | 11/2017 | Yoshioka et al. | |
| 2018/0033536 A1 | 2/2018 | Nishi et al. | |
| 2018/0061561 A1 | 3/2018 | Sim et al. | |
| 2018/0286558 A1* | 10/2018 | Yokoyama | H01F 17/0033 |
| 2020/0027653 A1 | 1/2020 | Terauchi et al. | |
| 2020/0111609 A1 | 4/2020 | Sato et al. | |
| 2020/0211767 A1 | 7/2020 | Hou et al. | |

FOREIGN PATENT DOCUMENTS

| | | | | |
|---|---|---|---|---|
| JP | 2005-129793 A | | 5/2005 | |
| JP | 2006-351954 A | | 12/2006 | |
| JP | 2006351954 A | * | 12/2006 | |
| JP | 2007-281315 A | | 10/2007 | |
| JP | 2012-160506 A | | 8/2012 | |
| JP | 2013-098187 A | | 5/2013 | |
| JP | 2015-073052 A | | 4/2015 | |
| JP | 2015073052 A | * | 4/2015 | |
| JP | 2016-186963 A | | 10/2016 | |
| WO | 2017/141681 A1 | | 8/2017 | |

* cited by examiner

MULTILAYER COIL ARRAY

CROSS-REFERENCE TO RELATED APPLICATION

This application claims benefit of priority to Japanese Patent Application No. 2018-190195, filed Oct. 5, 2018, the entire content of which is incorporated herein by reference.

BACKGROUND

Technical Field

The present disclosure relates to a multilayer coil array.

Background Art

Japanese Unexamined Patent Application Publication No. 2016-186963 discloses a coil component of the related art. That is, Japanese Unexamined Patent Application Publication No. 2016-186963 discloses a multilayer electronic component in which magnetic layers and conductor patterns are stacked on top of one another and a coil is formed inside the resulting multilayer body by connecting the conductor patterns between the magnetic layers. The magnetic layers are formed of a metal magnetic material. At least one extending conductor pattern of the coil is connected to an outer terminal formed on a bottom surface of the multilayer body by a conductor formed at a corner of the multilayer body.

In a multilayer coil array in which a plurality of coils are stacked inside an element body, there is a possibility of a short circuit occurring between adjacent coils. Investigations were carried out with the aim of suppressing such a short circuit, and as a result it was found that a short circuit could be suppressed by providing an insulating non-magnetic layer between adjacent coils. However, there was a problem in that magnetic flux is interrupted if the upper end or the lower end of a coil contacts the non-magnetic layer. On the other hand, although the interruption of magnetic flux can be suppressed when a magnetic layer is provided between the coil and the non-magnetic layer, there was a problem in that the plurality of coils can no longer magnetically couple with each other if the coil and the non-magnetic layer are completely separated from each other by the magnetic layer.

SUMMARY

Accordingly, the present disclosure provides a multilayer coil array that can suppress a short circuit between adjacent coils and that can control the coupling coefficient between coils to a desired value.

The inventors of the present disclosure found that the coupling coefficient between adjacent coils can be controlled to a desired value while suppressing a short circuit between the coils by making the length of a coil conductor layer that contacts a non-magnetic layer among the coil conductor layers of the coil conductor that contacts the non-magnetic layer different from the length of the other coil conductor layers, and this finding led to realization of the present disclosure.

An embodiment of the present disclosure provides a multilayer coil array that includes an element body that includes a magnetic layer containing magnetic particles; a first coil and a second coil that are built into the element body; and a first outer electrode, a second outer electrode, a third outer electrode, and a fourth outer electrode that are provided on a surface of the element body and are respectively electrically connected to end portions of the first coil and the second coil. A non-magnetic layer is provided between the first coil and the second coil. The first coil and the second coil are each formed by a plurality of coil conductors being connected to each other in a stacking direction. At least one out of a coil conductor of the first coil that is closest to the second coil among the plurality of coil conductors of the first coil and a coil conductor of the second coil that is closest to the first coil among the plurality of coil conductors of the second coil contacts the non-magnetic layer. A length of a coil conductor layer that contacts the non-magnetic layer among coil conductor layers of the coil conductor that contacts the non-magnetic layer is different from a length of the other coil conductor layer(s).

The multilayer coil array according to the embodiment of the present disclosure is able to suppress a short circuit between adjacent coils and control the coupling coefficient between the coils to a desired value as a result of the multilayer coil array having the above-described features.

Other features, elements, characteristics and advantages of the present disclosure will become more apparent from the following detailed description of preferred embodiments of the present disclosure with reference to the attached drawings.

DETAILED DESCRIPTION

Figure 1A:
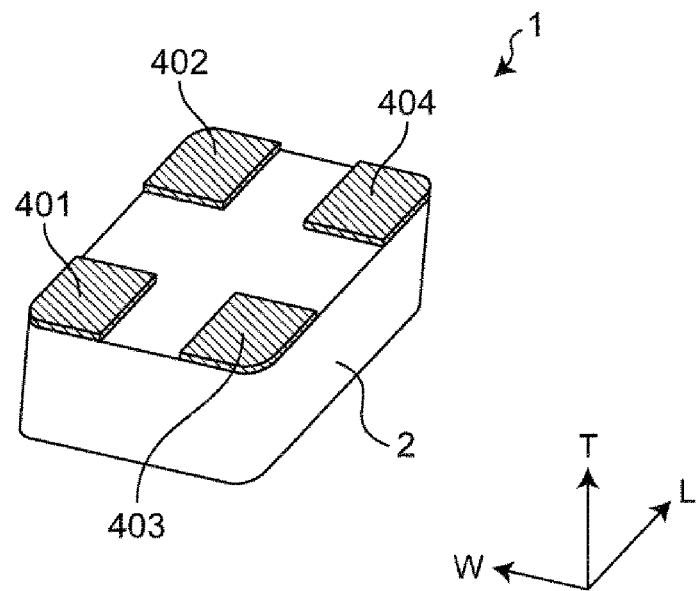
FIG. 1A is a perspective view seen from a bottom surface side of a multilayer coil array according to an embodiment of the present disclosure.

Hereafter, a multilayer coil array according to an embodiment of the present disclosure will be described in detail while referring to the drawings. The embodiment described hereafter is for illustrative purposes and the present disclosure is not limited to the embodiment described hereafter. Unless specifically stated otherwise, it is not intended that scope of the present disclosure be limited to the dimensions, materials, shapes, relative arrangements, and so forth of constituent components described hereafter and these are merely explanatory examples. In addition, the sizes, shapes, positional relationships, and so forth of the constituent elements illustrated in the drawings may be exaggerated for the sake of clear explanation.

Figure 1B:
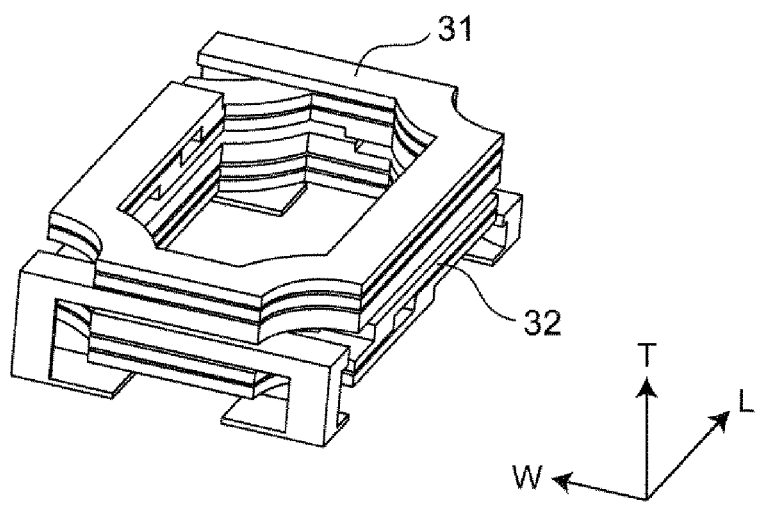
FIG. 1B is a perspective view that schematically illustrates the shapes of coils provided inside the multilayer coil array according to the embodiment of the present disclosure.

A multilayer coil array 1 according to an embodiment of the present disclosure is illustrated in FIGS. 1A and 1B. FIG. 1A is a perspective view in which the multilayer coil array 1 of the embodiment of the present disclosure is seem from the bottom surface side and FIG. 1B is a perspective view that schematically illustrates the shapes of a first coil 31 and a second coil 32, which are provided inside the multilayer coil array 1. The multilayer coil array 1 according to this embodiment includes an element body 2 that includes a magnetic layer containing magnetic particles; the first coil 31 and the second coil 32, which are built into the element body 2; and a first outer electrode 401, a second outer electrode 402, a third outer electrode 403, and a fourth outer electrode 404 that are provided on a surface of the element body 2 and are respectively electrically connected to end portions of the first coil 31 and the second coil 32. In the present specification, the lengths, widths, and thicknesses (heights) of the multilayer coil array 1 and the element body 2 may be denoted as "L", "W", and "T", respectively (refer to FIGS. 1A and 1B). In addition, in the present specification, a direction parallel to the length L of the element body 2 may be referred to as an "L direction", a direction parallel to the width W of the element body 2 may be referred to as a "W direction", a direction parallel to the thickness direction T of the element body 2 may be referred to as a "T direction", a plane parallel to the L direction and the T direction may be referred to as an "LT plane", a plane parallel to the W direction and the T direction may be referred to as a "WT plane", and a plane parallel to the L direction and the W direction may be referred to as an "LW plane".

The size of the multilayer coil array 1 according to this embodiment is not particularly limited, but the length (L) is preferably 1.45-2.7 mm, the width (W) is preferably 0.65-2.2 mm, and the height (T) is preferably 0.45-1.2 mm.

Figure 3A:
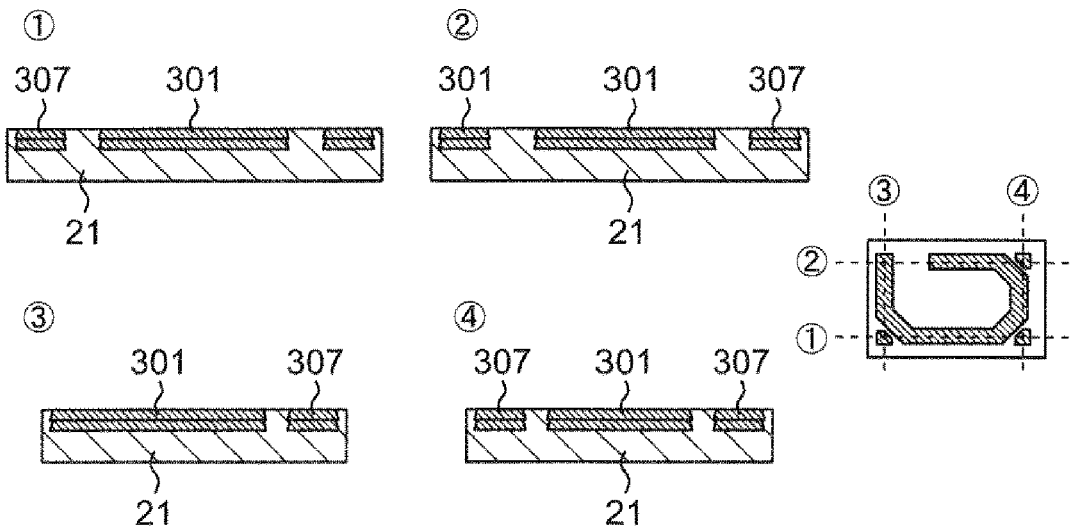
FIG. 3A is a schematic diagram for describing a method of manufacturing the multilayer coil array according to the embodiment of the present disclosure.
Figure 3B:
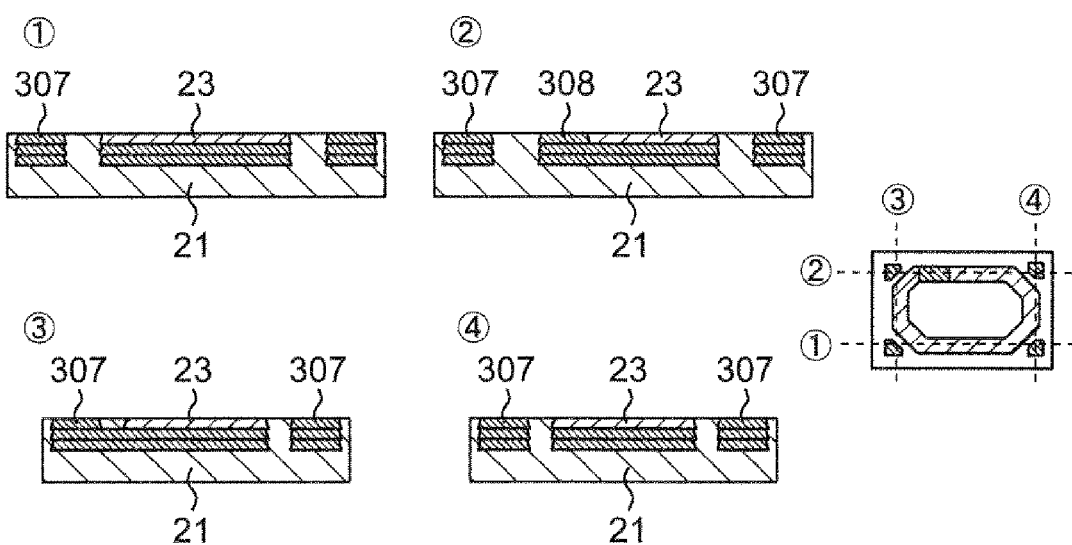
FIG. 3B is a schematic diagram for describing the method of manufacturing the multilayer coil array according to the embodiment of the present disclosure.
Figure 3C:
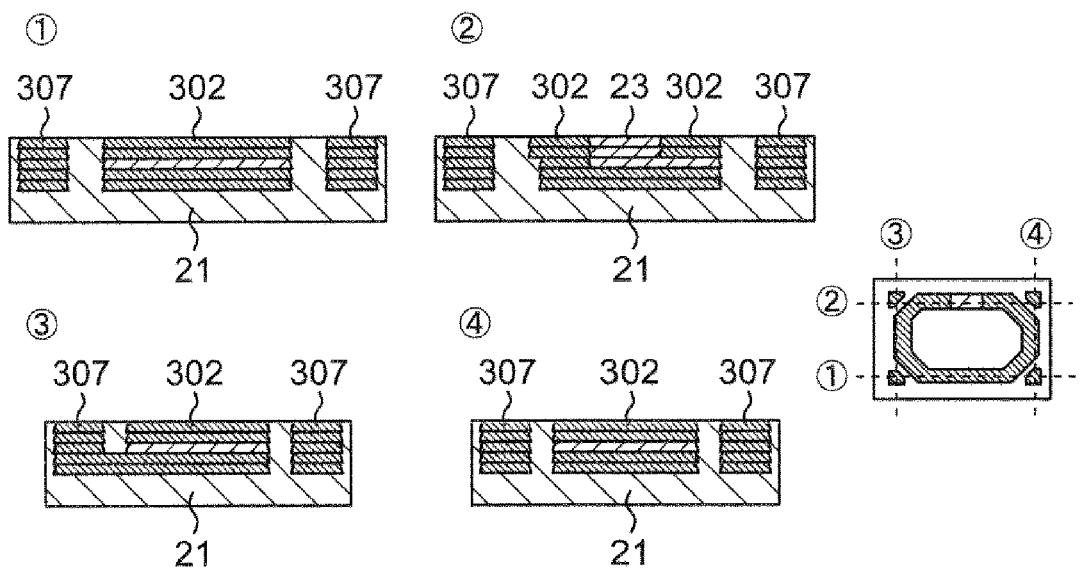
FIG. 3C is a schematic diagram for describing the method of manufacturing the multilayer coil array according to the embodiment of the present disclosure.
Figure 3D:
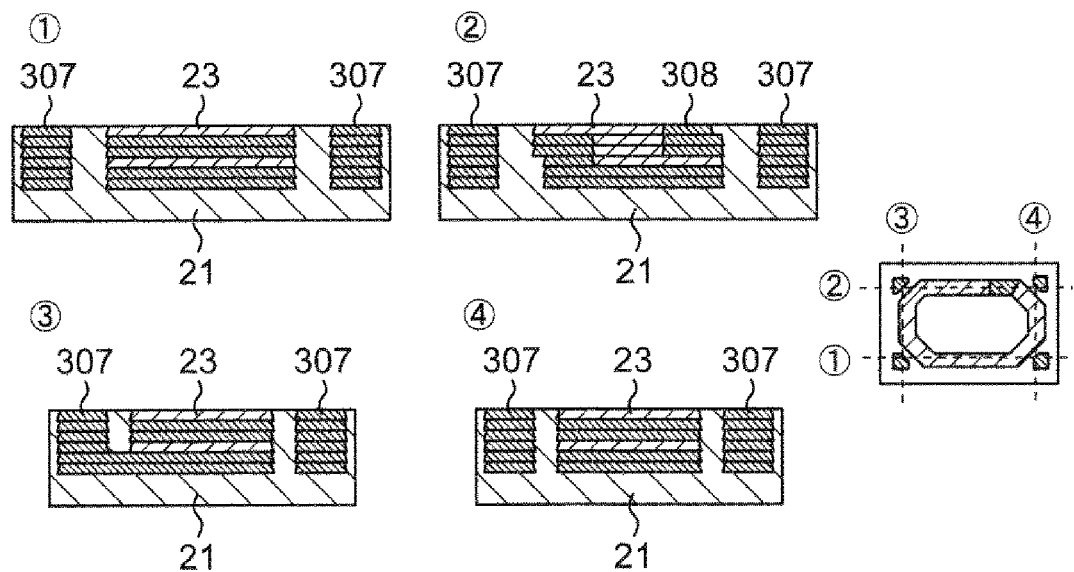
FIG. 3D is a schematic diagram for explaining the method of manufacturing the multilayer coil array according to the embodiment of the present disclosure.
Figure 3E:
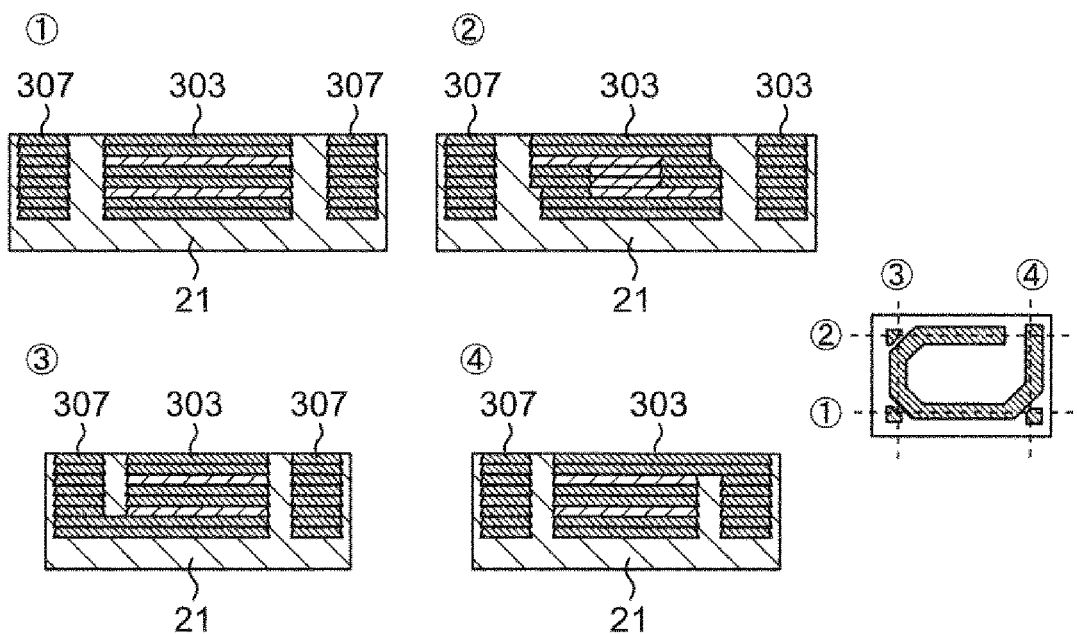
FIG. 3E is a schematic diagram for describing the method of manufacturing the multilayer coil array according to the embodiment of the present disclosure.
Figure 3F:
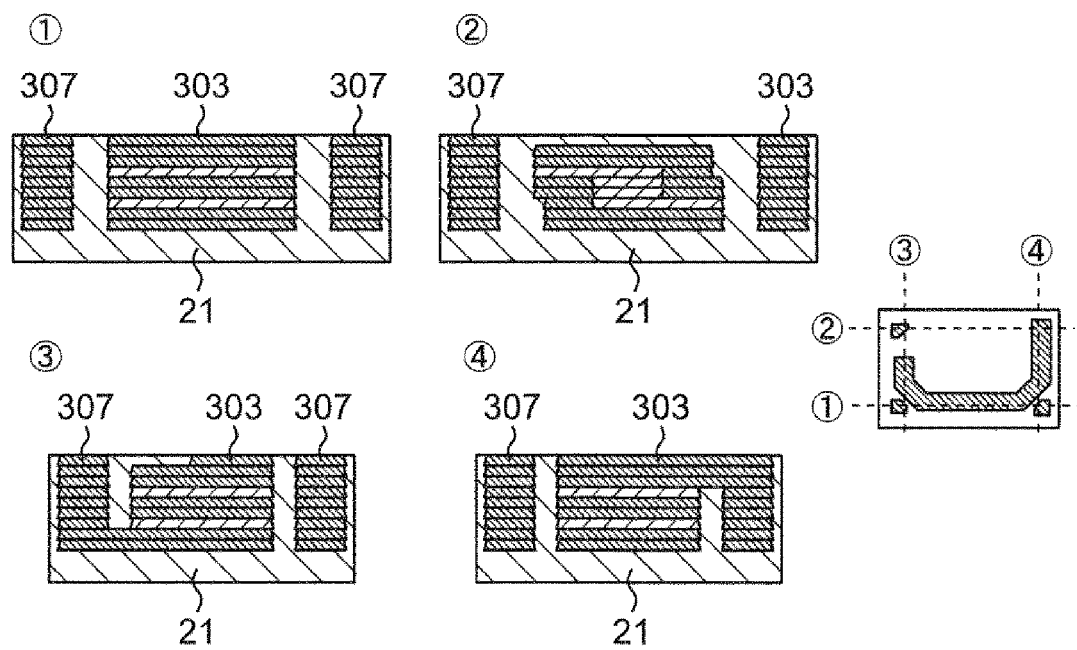
FIG. 3F is a schematic diagram for describing the method of manufacturing the multilayer coil array according to the embodiment of the present disclosure.
Figure 3G:
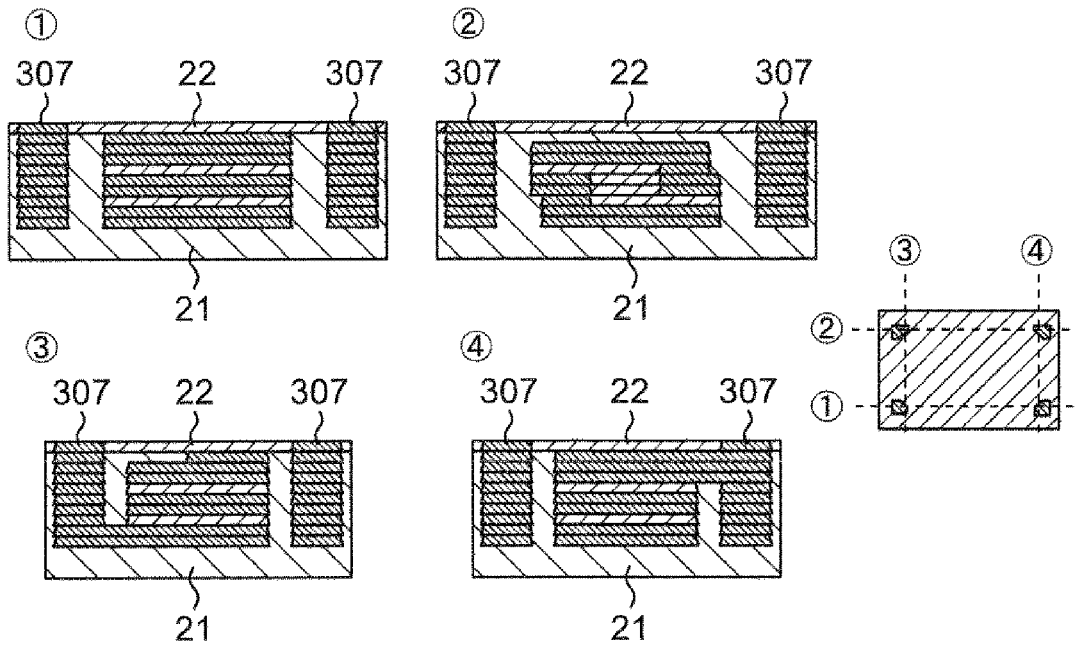
FIG. 3G is a schematic diagram for describing the method of manufacturing the multilayer coil array according to the embodiment of the present disclosure.

The element body 2 of the multilayer coil array 1 according to this embodiment includes a magnetic layer 21 and a non-magnetic layer 22 (See, FIG. 3G). The element body 2 may also include a non-magnetic portion 23 (See, FIGS. 3B-3D and 3J-3L) which is described later, in addition to the non-magnetic layer 22.

Magnetic Layer

The magnetic layer 21 contains magnetic particles formed of a magnetic material. The magnetic particles may be particles composed of a metal magnetic material (metal magnetic particles) such as Fe, Co, Ni or an alloy including any of these metals, or may be ferrite particles. The magnetic particles are preferably Fe particles or Fe alloy particles. Preferred Fe alloys include Fe—Si alloys, Fe—Si—Cr alloys, Fe—Si—Al alloys, Fe—Si—B—P—Cu—C alloys, and Fe—Si—B—Nb—Cu alloys. It is preferable that the surfaces of the metal magnetic particles composed of a metal magnetic material described above be covered with an insulating film. The degree of insulation between the metal magnetic particles can be increased when the surfaces of the metal magnetic particles are covered with an insulating film. The method used to form the insulating film on the surfaces of the metal magnetic particles will be described later. The material forming the insulating film is preferably an oxide of P, Si, or the like. Furthermore, the insulating film may be an oxide film formed by oxidizing the surfaces of the metal magnetic particles. The thickness of the insulating film is preferably 1-50 nm, more preferably 1-30 nm, and still more preferably 1-20 nm. As described later, the thickness of the insulating film may be obtained by capturing an image using a scanning electron microscope (SEM) of a cross section obtained by grinding a multilayer coil array test piece and measuring the thickness of the insulating film on the surfaces of the metal magnetic particles from the obtained SEM image.

The average particle diameter of the metal magnetic particles in the magnetic layer 21 is preferably 1-30 μm, more preferably 1-20 μm, and still more preferably 1-10 μm. The average particle diameter of the metal magnetic particles in the magnetic layer 21 can be measured using the procedure described below. Images of a cross section obtained by cutting a test piece of the multilayer coil array 1 are captured at a plurality of (for example, five) regions (for example, 130 μm×100 μm) using an SEM, the obtained SEM images are analyzed using image analysis software (for example, A Zou Kun (Registered Trademark) produced by Asahi Kasei Engineering Corporation), and the equivalent circle diameters of the metal particles are obtained. The average value of the obtained equivalent circle diameter is obtained as the average value of the metal magnetic particles.

Non-Magnetic Layer 21

The element body 2 of the multilayer coil array 1 according to this embodiment includes the non-magnetic layer 22 in addition to the magnetic layer 21. As described later, the non-magnetic layer 22 is provided between the first coil 31 and the second coil 32. As a result of providing the non-magnetic layer 22, the degree of insulation between the first coil 31 and the second coil 32 can be increased and the generation of a short circuit between the first coil 31 and the second coil 32 can be suppressed. The non-magnetic layer 22 may include a glass ceramic material, a non-magnetic ferrite material, and so on as a non-magnetic material. The non-magnetic layer 22 preferably includes non-magnetic ferrite as a non-magnetic material. A non-magnetic ferrite material having a composition that contains 40-49.5 mol % of Fe in the form of $Fe_2O_3$, 6-12 mol % of Cu in the form of CuO, with the remainder consisting of ZnO can be used as the non-magnetic ferrite material. $Mn_3O_4$, $Co_3O_4$, $SnO_2$, $Bi_2O_3$, $SiO_2$, and so on may be added to the non-magnetic material as necessary as additives and the non-magnetic material may also contain trace amounts of unavoidable impurities. The non-magnetic layer 22 preferably contains a Zn—Cu ferrite.

The thickness of the non-magnetic layer 22 can be measured using the procedure described below. A multilayer coil array test piece is stood up vertically, the region surrounding the test piece is filled with resin, and the resin is solidified. At this time, the LT plane is exposed. The grinding performed with the grinding machine is terminated at depth of around ½ the dimension of the test piece in the W direction of the test piece and a cross section parallel to the LT plane is exposed. After termination of the grinding, the ground surface is processed using ion milling (Ion Milling Apparatus IM4000 manufactured by Hitachi High-Technologies Corp.) in order to remove burrs produced by the grinding from the inner conductors. An image of a portion substantially in the center of an additional non-magnetic layer in the ground test piece is captured using a scanning electron microscope (SEM), the thickness of the portion substantially in the center of the additional non-magnetic layer is measured from the obtained SEM image, and the measured value is taken as the thickness of the additional non-magnetic layer.

In the multilayer coil array 1, as will be described later, it is preferable that a non-magnetic portion 23 be provided in at least one place between adjacent coil conductors among the plurality of coil conductors of the first coil 31 (first to third coil conductors) and the plurality of coil conductors of the second coil 32 (fourth to sixth coil conductors). Leakage of magnetic flux can be prevented by providing the non-magnetic portion 23.

It is preferable that the non-magnetic layer 22 and the non-magnetic portion 23 have the same composition. For example, it is preferable that the non-magnetic layer 22 and the non-magnetic portion 23 be formed of a Zn—Cu ferrite.

Coil

The first coil 31 and the second coil 32 are provided inside the element body 2. As will be described later, the first coil 31 and the second coil 32 are each formed as a result of a plurality of coil conductors being connected to each other in the stacking direction. The first coil 31 and the second coil 32 may be formed of an electrically conductive material such as Ag. An electrically conductive paste may include a solvent, a resin, a dispersant, and so forth in addition to the electrically conductive material. The multilayer coil array 1 according to this embodiment includes two coils that are built into the element body 2 (refer to FIG. 1B and FIGS. 3A to 3S), but a multilayer coil array according to an embodiment of the present disclosure is not limited to this configuration and may instead include three or more coils. Furthermore, in the configuration illustrated in FIG. 1B and FIGS. 3A to 3S, the first coil 31 and the second coil 32 are each formed as a result of three coil conductors being connected to each other. However, the multilayer coil array 1 according to this embodiment is not limited to this configuration, and the multilayer coil array 1 may instead include coils formed by two coil conductors or four or more coil conductors being connected to each other depending on the desired inductance value of the coil and so forth.

The end portions of the first coil 31 and the second coil 32 are preferably electrically connected to the outer electrodes via connection portions that are provided outside the wound parts of the coils. By providing connection portions in this way, the parasitic capacitances of the multilayer coil array can be reduced, and therefore the resonant frequency can be increased.

In the multilayer coil array 1 according to this embodiment, at least one out of the coil conductor of the first coil 31 that is closest to the second coil 32 among the plurality of coil conductors of the first coil 31 and the coil conductor of the second coil that is closest to the first coil 31 among the plurality of coil conductors of the second coil contacts the non-magnetic layer 22. With this configuration, the degree of insulation between the first coil 31 and the second coil 32 can be increased and generation of a short circuit between the first coil 31 and the second coil 32 can be suppressed.

Figure 2:
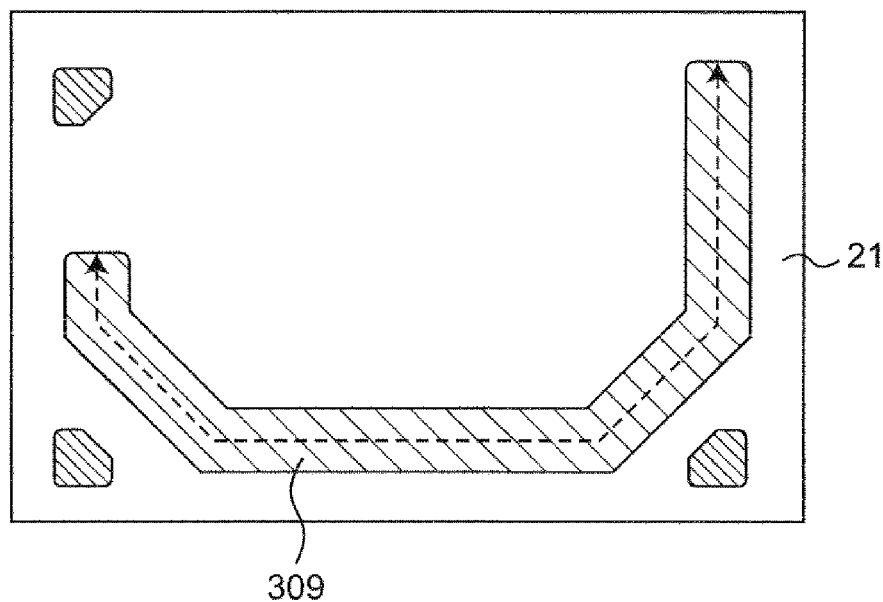
FIG. 2 is a schematic diagram for describing the length of a coil conductor layer.

In the multilayer coil array 1 according to this embodiment, the length of the coil conductor layer that contacts the non-magnetic layer 22 among the coil conductor layers constituting the coil conductor that contacts the non-magnetic layer 22 is different from the lengths of the other coil conductor layers. The coupling coefficient between the first coil and second coil can be changed by controlling the length of the coil conductor layers in this way. Here, "the length of a coil conductor layer" refers to the length in the winding direction of the coil. As illustrated in FIG. 2, the length of a coil conductor layer 309 that contacts the non-magnetic layer 22 is a value obtained by measuring the length of the coil conductor layer 309 along a portion of the coil conductor layer 309 that is substantially in the center (location at ½ the width) of the coil conductor layer 309 when the coil conductor layer 309 is viewed in the stacking direction. In addition, in the multilayer coil array 1 according to this embodiment, although it is sufficient that only the length of the coil conductor layer that contacts the non-magnetic layer 22 among the coil conductor layers constituting the coil conductor that contacts the non-magnetic layer 22 be made different from the lengths of the other coil conductor layers, alternatively the length of the entire coil conductor that contacts the non-magnetic layer 22 (that is, the length of all the coil conductor layers constituting the coil conductor) may be made different from the lengths of the other coil conductors. The coupling coefficient between the first coil and the second coil can be changed with this configuration as well.

It is preferable that the length of the coil conductor layer that contacts the non-magnetic layer 22 among the coil conductor layers that form the coil conductor that contacts the non-magnetic layer 22 be smaller than the length of the other coil conductor layers. It is possible to improve the coupling coefficient between the first coil and the second coil by making the length of the coil conductor layer that contacts the non-magnetic layer 22 small and filling the region where the coil conductor layer does not exist with a magnetic layer.

Outer Electrodes

The multilayer coil array 1 according to this embodiment includes the first outer electrode 401, the second outer electrode 402, the third outer electrode 403, and the fourth outer electrode 404 that are provided on a surface of the element body 2 and are respectively electrically connected to end portions of the first coil 31 and the second coil 32. In the configuration illustrated in FIG. 1A, the first outer electrode 401, the second outer electrode 402, the third outer electrode 403, and the fourth outer electrode 404 are provided on only the bottom surface of the element body 2, but the multilayer coil array according to this embodiment is not limited to this configuration, and the first to fourth outer electrodes 401 to 404 may instead be provided so as to extend from the bottom surface of the element body 2 onto other side surfaces that are adjacent to the bottom surface. For example, the first to fourth outer electrodes 401 to 404 may be substantially L-shaped electrodes that are provided so as to extend from the bottom surface of the element body 2 onto the WT surfaces that are adjacent to the bottom surface. The first to fourth outer electrodes 401 to 404 may be formed of an electrically conductive material such as Ag.

The outer electrodes may be each formed of a base electrode layer that contains Ag and one or more plating layers that are provided on the base electrode layer.

The thickness of each outer electrode is preferably 5-100 µm. The thickness of each outer electrode is more preferably 10-50 µm. Solder leaching and thermal shock resistance can be improved when the thickness of the outer electrodes is greater than or equal to 5 µm. When the thickness of the outer electrodes is less than or equal to 100 µm and more preferably less than or equal to 50 µm, sufficient volume is secured for the magnetic parts and therefore good electrical characteristics can be secured.

The thickness of the outer electrodes can be measured using the procedure described below. A test piece is ground down using the same method as described above, and an image of an outer electrode part is captured using an SEM. A measurement is taken at one place substantially in the center of the outer electrode in the captured SEM image and the obtained value is taken to be thickness of the outer electrodes.

The multilayer coil array according to the embodiment of the present disclosure can be suitably used as a coil component of a DC-DC converter.

Method of Manufacturing Multilayer Coil Array

Figure 3H:
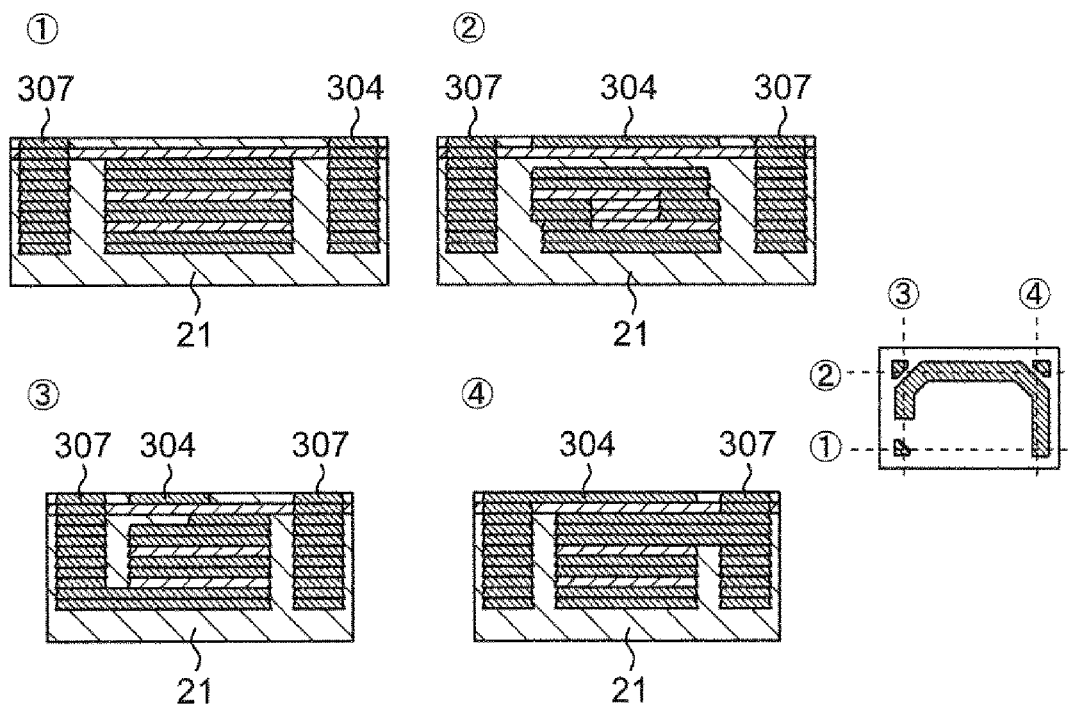
FIG. 3H is a schematic diagram for describing the method of manufacturing the multilayer coil array according to the embodiment of the present disclosure.
Figure 3I:
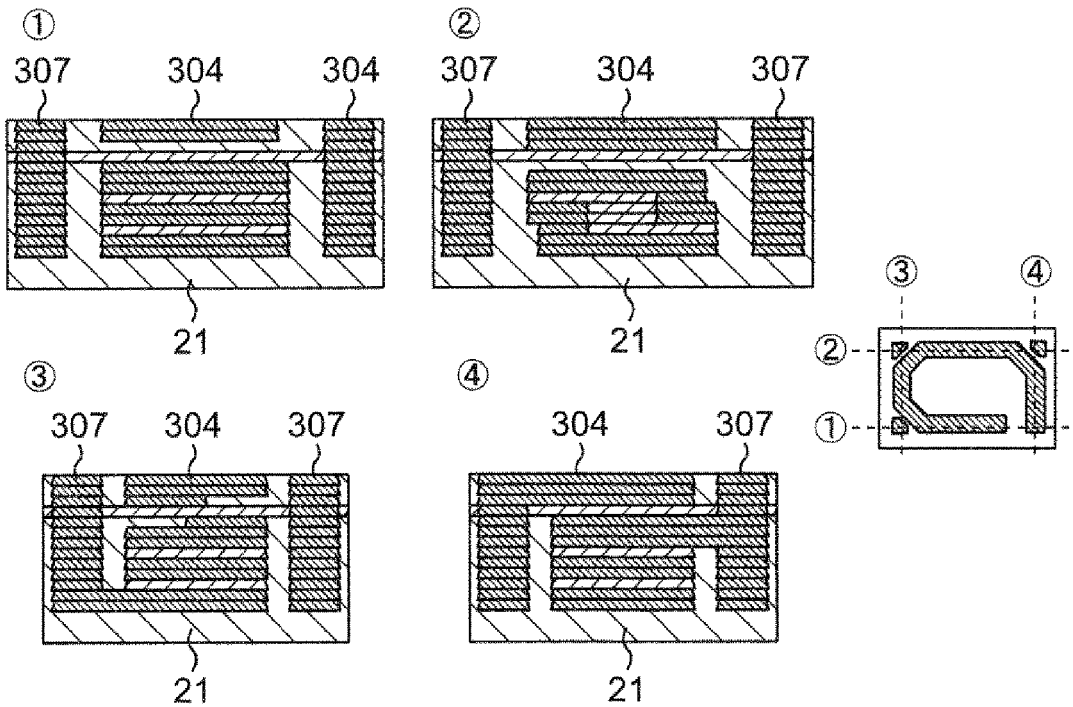
FIG. 3I is a schematic diagram for describing the method of manufacturing the multilayer coil array according to the embodiment of the present disclosure.
Figure 3J:
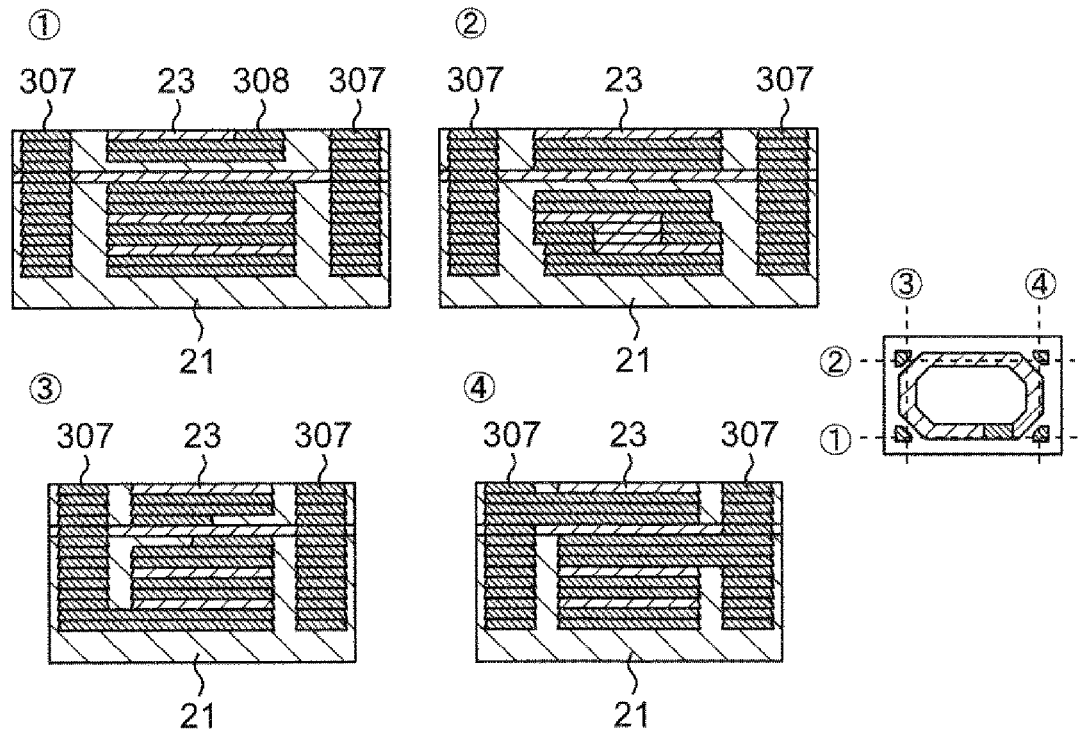
FIG. 3J is a schematic diagram for describing the method of manufacturing the multilayer coil array according to the embodiment of the present disclosure.
Figure 3K:
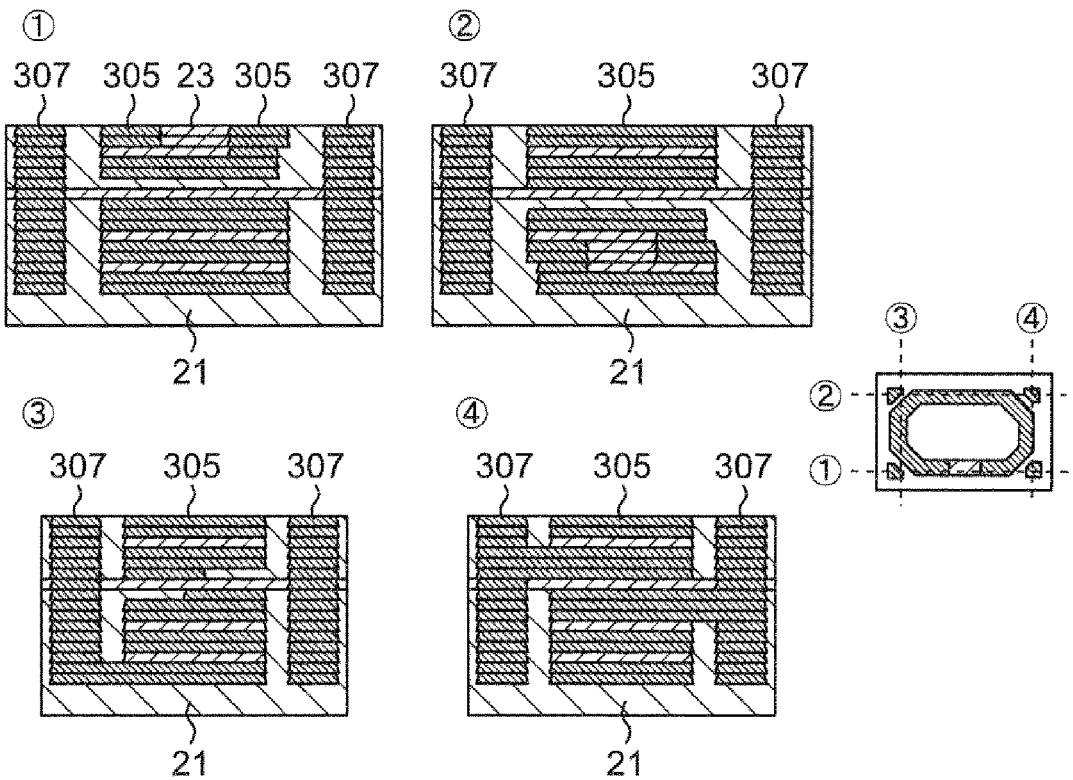
FIG. 3K is a schematic diagram for describing the method of manufacturing the multilayer coil array according to the embodiment of the present disclosure.
Figure 3L:
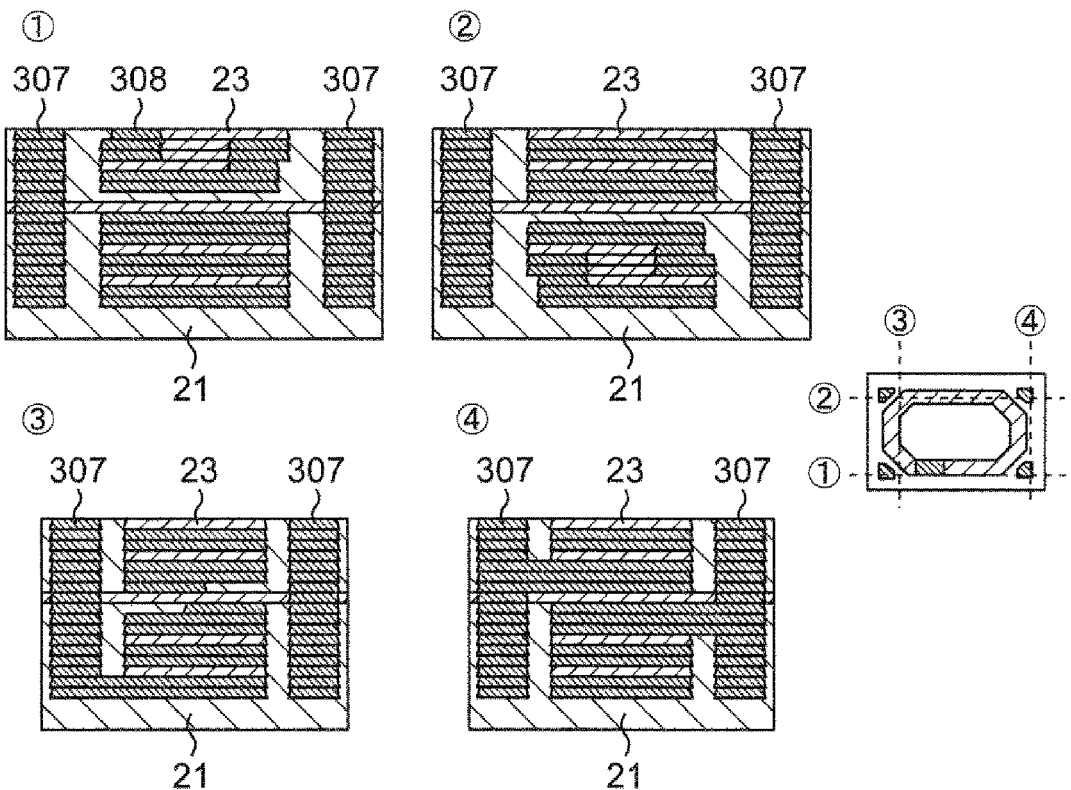
FIG. 3L is a schematic diagram for describing the method of manufacturing the multilayer coil array according to the embodiment of the present disclosure.
Figure 3M:
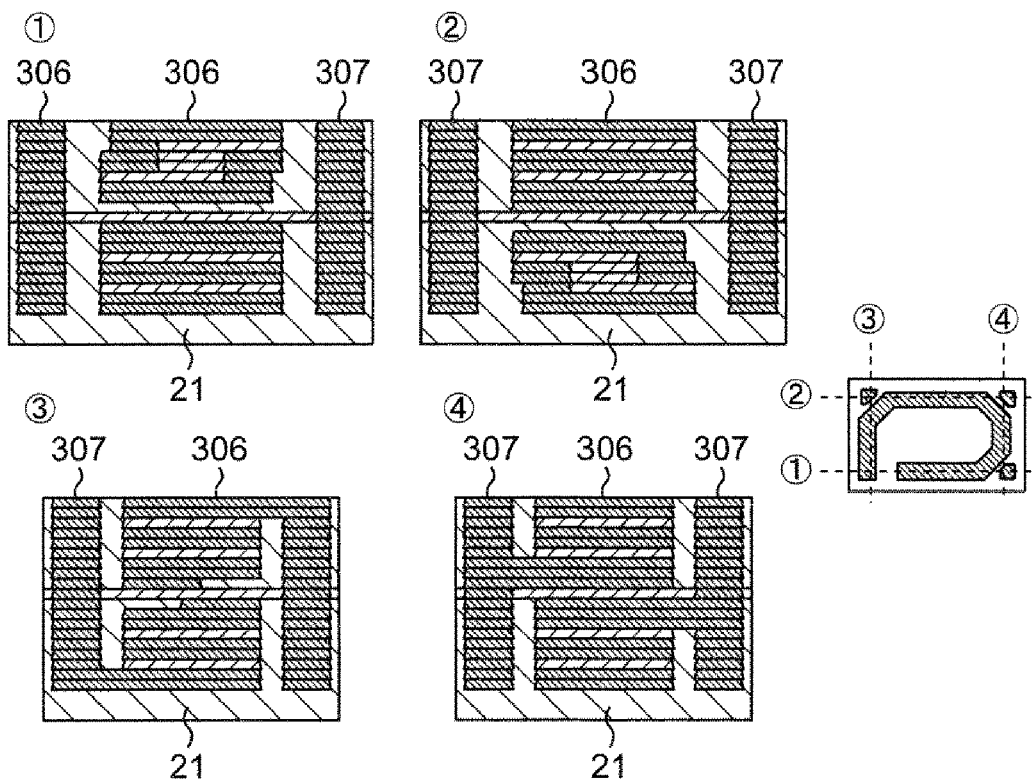
FIG. 3M is a schematic diagram for describing the method of manufacturing the multilayer coil array according to the embodiment of the present disclosure.
Figure 3N:
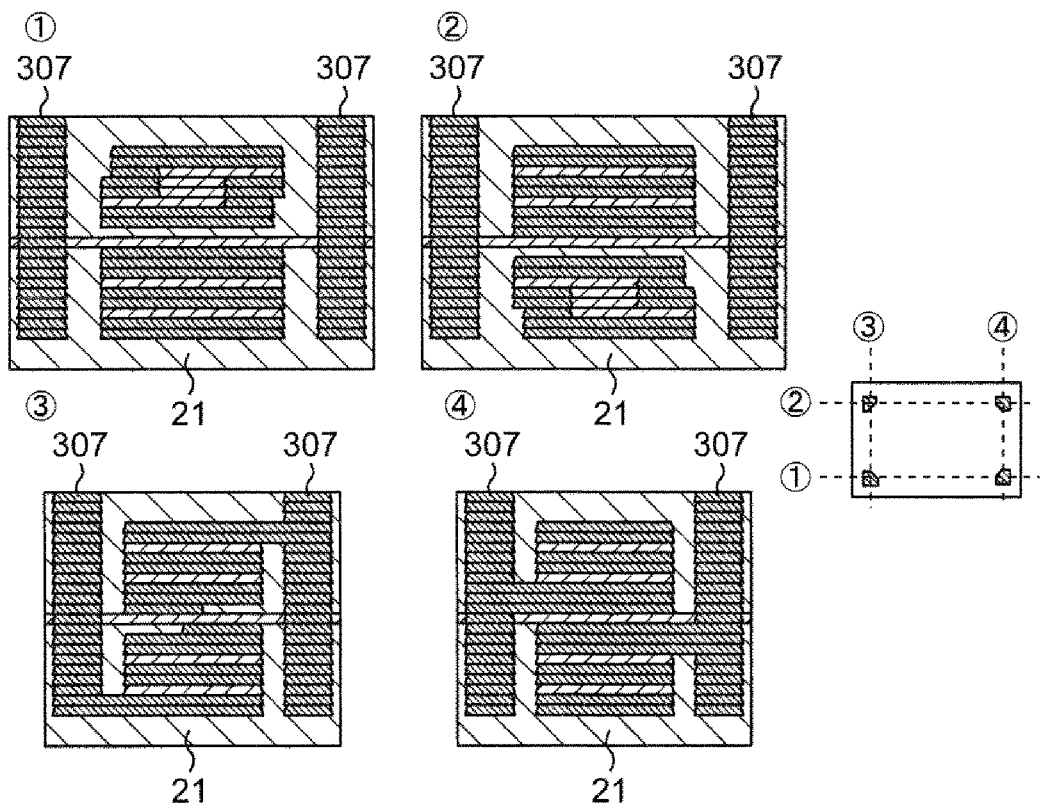
FIG. 3N is a schematic diagram for describing the method of manufacturing the multilayer coil array according to the embodiment of the present disclosure.
Figure 3O:
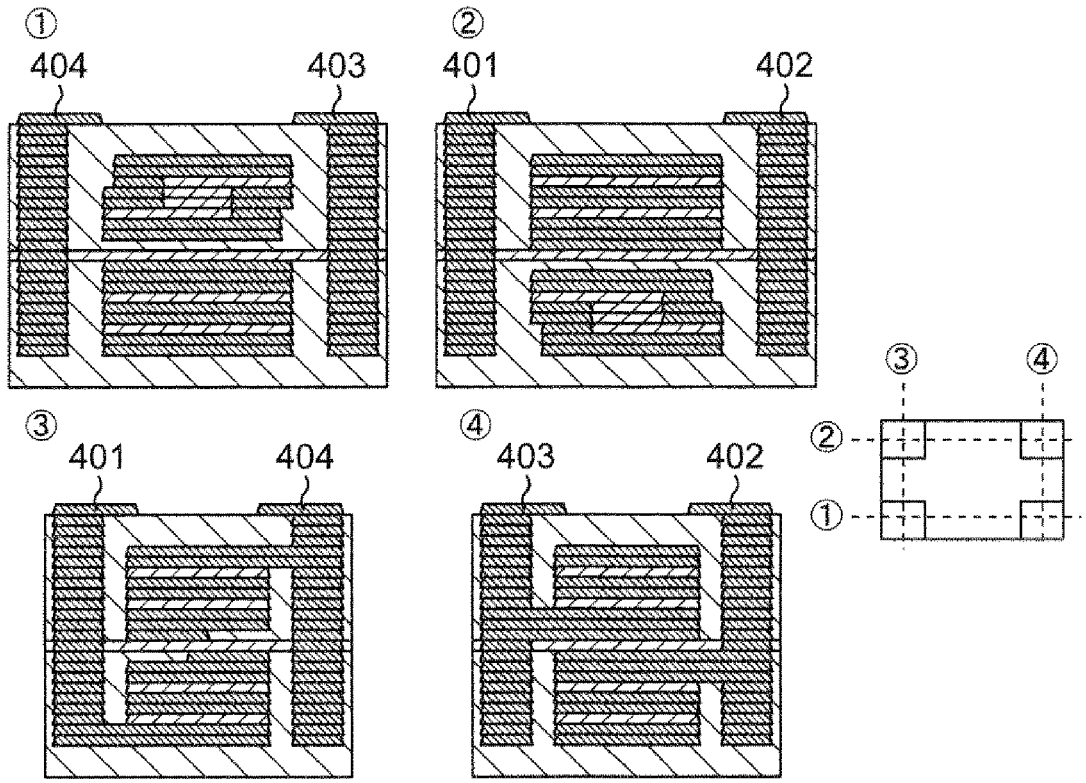
FIG. 3O is a schematic diagram for describing the method of manufacturing the multilayer coil array according to the embodiment of the present disclosure.
Figure 3P:
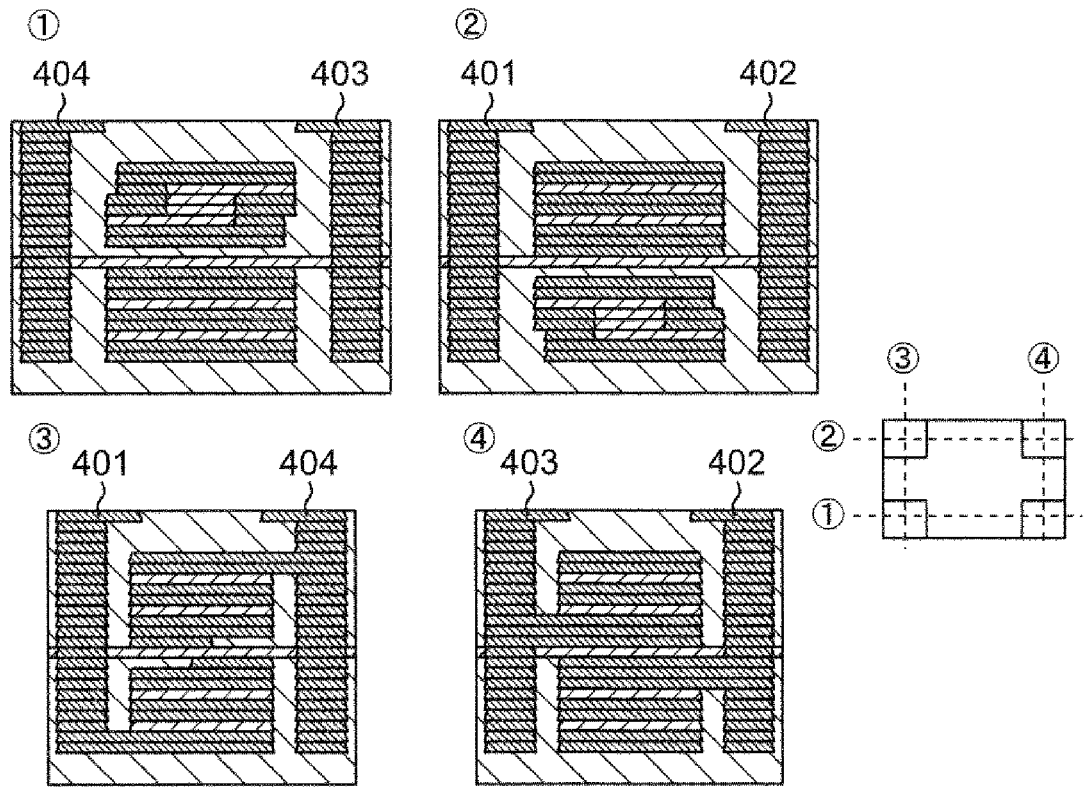
FIG. 3P is a schematic diagram for describing the method of manufacturing the multilayer coil array according to the embodiment of the present disclosure.
Figure 3Q:
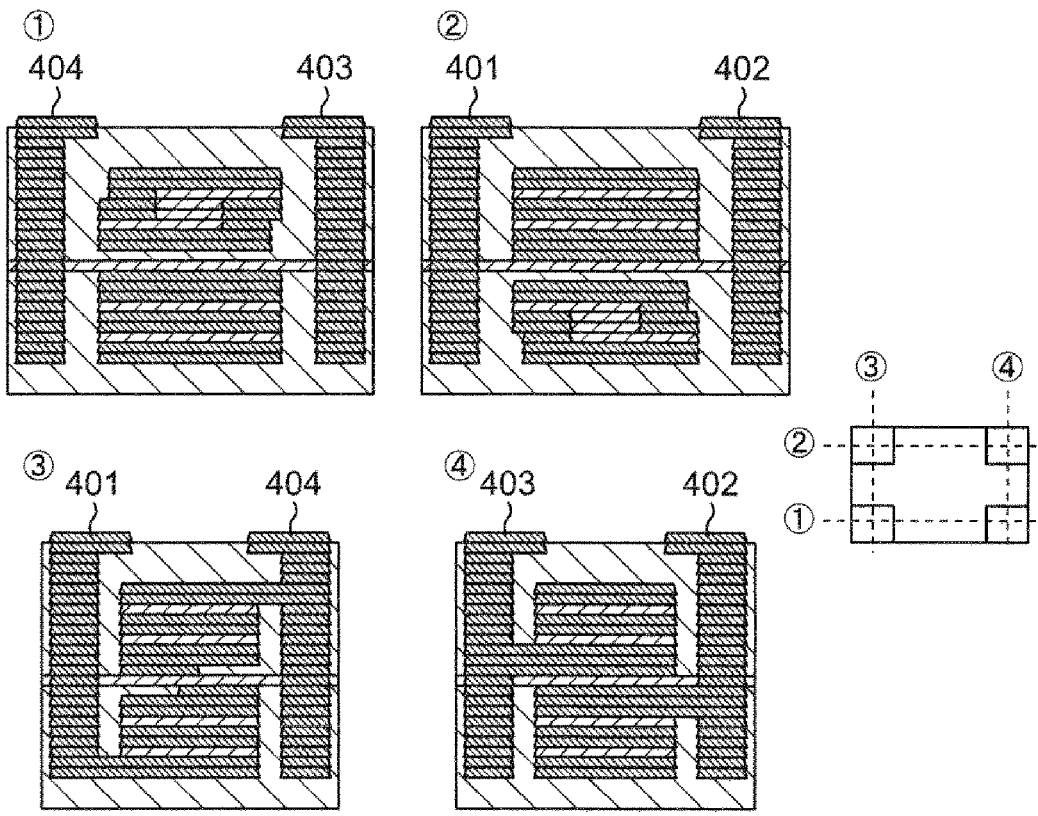
FIG. 3Q is a schematic diagram for describing the method of manufacturing the multilayer coil array according to the embodiment of the present disclosure.

Next, a method of manufacturing the multilayer coil array 1 according to this embodiment will be described hereafter while referring to FIGS. 3A to 3S. The method of manufacturing the multilayer coil array 1 according to this embodiment is not limited to the method described below. In FIGS. 3A to 3S, the drawings on the right-hand side are plan views of a multilayer body during the various manufacturing processes and the remaining drawings are sectional views taken along broken lines 1 to 4 illustrated in the plan views.

First, in the procedure described hereafter, a multilayer body is prepared that has two coils (first coil 31 and second coil 32) formed inside thereof and that includes the magnetic layer 21. In FIGS. 3A to 3S, a multilayer body corresponding to one multilayer coil array is illustrated, but in the actual manufacturing method, a plurality of the multilayer coil arrays would be manufactured by molding a multilayer body corresponding to a plurality of multilayer coil arrays in an integrated manner and then dividing the multilayer body.

Preparation of Magnetic Paste

A magnetic paste is used to form the magnetic layer 21. The magnetic paste includes a magnetic material. The magnetic paste may include a binder, a solvent, a plasticizer, and so forth in addition to the magnetic material.

Magnetic Material

Particles composed of a metal magnetic material (metal magnetic particles) such as Fe, Co, Ni or an alloy including any of these metals or ferrite particles can be used as the magnetic material. The magnetic material is preferably Fe or an Fe alloy. Preferred Fe alloys include Fe—Si alloys, Fe—Si—Cr alloys, Fe—Si—Al alloys, Fe—Si—B—P—Cu—C alloys, and Fe—Si—B—Nb—Cu alloys. It is preferable that the surfaces of the metal magnetic particles composed of a metal magnetic material described above be covered with an insulating film. The degree of insulation between the metal magnetic particles can be increased when the surfaces of the metal magnetic particles are covered with an insulating film. A known sol gel method, mechanochemical method, and so on can be used as the method for forming the insulating film. The material forming the insulating film is preferably an oxide of P, Si, or the like. Furthermore, the insulating film may be an oxide film formed by oxidizing the surfaces of the metal magnetic particles. The thickness of the insulating film is preferably 1-50 nm, more preferably 1-30 nm, and still more preferably 1-20 nm. As described above, the thickness of the insulating film may be obtained by capturing an image using a scanning electron microscope (SEM) of a cross section obtained by grinding a multilayer coil array test piece and measuring the thickness of the insulating film on the surfaces of the metal magnetic particles from the obtained SEM image.

The average particle diameter of the metal magnetic particles is preferably 1-30 µm, more preferably 1-20 µm, and still more preferably 1-10 µm. Here, the "average particle diameter" of the metal particles of the raw material refers to a volume based median diameter ($D_{50}$).

ZnO powder is added to the above-described metal magnetic particles in an amount of around 0.2-2 wt % with respect to the total weight of the metal magnetic particles and the ZnO powder. In addition, the magnetic paste is prepared by adding and kneading predetermined amounts of a binder (such as ethyl cellulose resin), a solvent (such as terpineol), a plasticizer, and so on. The degree of insulation between the metal magnetic particles can be further increased by adding a predetermined amount of ZnO powder to the metal magnetic particles.

Preparation of Non-Magnetic Paste

A non-magnetic paste is used to form the non-magnetic layer 22 and the non-magnetic portion 23. The non-magnetic paste includes a non-magnetic material. The non-magnetic paste may include a binder, a solvent, a plasticizer, and so forth in addition to the non-magnetic material.

Non-Magnetic Material

A glass ceramic material, a non-magnetic ferrite material, and so forth can be used as the non-magnetic material, but it is preferable that a non-magnetic ferrite material be used. A non-magnetic ferrite material having a composition that contains 40-49.5 mol % of Fe in the form of $Fe_2O_3$, 6-12 mol % of Cu in the form of CuO, with the remainder consisting of ZnO can be used as the non-magnetic ferrite material. $Mn_3O_4$, $Co_3O_4$, $SnO_2$, $Bi_2O_3$, $SiO_2$, and so on may be added to the non-magnetic material as necessary as additives and the non-magnetic material may also contain trace amounts of unavoidable impurities.

$Fe_2O_3$, ZnO, CuO, and so on are weighed so as to be at a prescribed ratio, wet mixed and pulverized, and then dried. A non-magnetic ferrite material powder is prepared by calcining the obtained dried mixture at a temperature of 700-800° C. A non-magnetic paste is prepared by adding and kneading prescribed amounts of a solvent (such as a ketone solvent), a binder (such as a polyvinyl acetal resin), and a plasticizer (such as alkyd-based plasticizer) to the non-magnetic ferrite material.

Preparation of Electrically Conductive Paste

An electrically conductive paste is used to form the first coil 31 and the second coil 32, and the first to fourth outer electrodes 401 to 404. The electrically conductive paste includes an electrically conductive material such as Ag powder. The electrically conductive paste may include a solvent, a resin, a dispersant, and so forth in addition to the electrically conductive material.

The electrically conductive paste is prepared by preparing Ag powder, adding prescribed amounts of a solvent (such as eugenol (4-allyl-2-methoxyphenol)), a resin (such as ethyl cellulose), and a dispersant, and kneading the resulting mixture. Here, the average particle diameter of the Ag powder (volume-based median diameter $D_{50}$) is preferably 1-10 µm. The coils 31 and 32 and the first to fourth outer electrodes 401 to 404 may be formed using the same electrically conductive paste, or may be formed using electrically conductive pastes having different compositions.

Manufacture of Element Body 2

A thermal release sheet and a polyethylene terephthalate (PET) film are stacked on a metal plate, a magnetic paste is applied onto the top of the PET film, and the magnetic paste is then dried. The part of the magnetic layer 21 on the upper surface side of the multilayer coil array is formed by repeating the process of applying and drying the magnetic paste so that the magnetic paste comes to have a prescribed thickness.

A first coil conductor 301 of the first coil 31 is formed by applying the electrically conductive paste onto the above-described magnetic layer 21. At this time, connection portions 307, which are for leading the terminating ends of the coils out to the bottom surface, are also formed by applying the electrically conductive paste at prescribed positions outside the first coil conductor 301. After drying the applied electrically conductive paste, the magnetic paste is applied so as to fill the regions around the first coil conductor 301 and the connection portions 307 and the applied magnetic paste is then dried. The process of applying and drying the electrically conductive paste and the magnetic paste is repeated such that the first coil conductor 301 and the magnetic layer 21 surrounding the first coil conductor 301 come to have a prescribed thickness, and thus the first coil conductor 301 is formed with the surrounding regions being filled with the magnetic layer 21 (refer to FIG. 3A). In the example illustrated in FIG. 3A, the process of applying and drying the electrically conductive paste and the magnetic paste is repeated two times.

The connection portions formed in the step illustrated in FIG. 3A do not directly contribute to connections between the terminating ends of the coils and the outer electrodes, but since the connection portions are provided at substantially symmetrical positions inside the element body 2, the difference between the shrinkage percentages of the different parts of the element body 2 can be made small when the connection portions illustrated in FIG. 3A are formed.

Next, a non-magnetic portion 23 is formed by applying the non-magnetic paste onto the top of the first coil conductor 301 except for in a region where a connection layer 308, which is for forming a connection to a second coil conductor 302 of the first coil 31, is to be formed. Next, the connection layer 308 is formed by applying the electrically conductive paste onto the above-described region where the non-magnetic paste was not applied. Furthermore, the electrically conductive paste is also applied at the positions where the connection portions 307 are to be formed. The magnetic paste is applied so as to fill the regions around the thus-formed non-magnetic portion 23, connection layer 308, and connection portions 307, and the applied magnetic paste is then dried. The above-described procedure is repeated so that the connection layer 308 comes to have a prescribed thickness (FIG. 3B).

Also, n layers of coil conductors forming the first coil 31 and n–1 layers of the connection layer 308 that is connected to the adjacent coil conductor are repeatedly stacked (n is an integer greater than or equal to 2) using the same procedure as described above. In the manufacturing example illustrated in FIGS. 3A to 3S, the second coil conductor 302 is formed by applying the electrically conductive paste on top of the above-described non-magnetic portion. At this time, the terminating end of the second coil conductor 302 extends up to the connection layer 308 and is connected to the first coil conductor 301 via the connection layer 308. Furthermore, at the same time, the electrically conductive paste is also applied at the positions where the connection portions 307 are to be formed. Next, a non-magnetic portion 23 is formed by applying the non-magnetic paste between the starting end and the terminating end of the second coil conductor 302. The magnetic paste is applied so as to fill the regions around the second coil conductor 302, the connection portions 307, and the non-magnetic portion 23 and the magnetic paste is then dried. The above-described procedure is repeated and the second coil conductor 302 is formed with the surrounding regions being filled with the magnetic layer 21 so that the second coil conductor 302 comes to have a prescribed thickness (FIG. 3C).

Next, a non-magnetic portion 23 is formed by applying the non-magnetic paste onto the top of the second coil conductor 302 except for in a region where a connection layer 308, which is for forming a connection to a third coil conductor 303 of the first coil 31, is to be formed. Next, the connection layer 308 is formed by applying the electrically conductive paste onto the above-described region where the non-magnetic paste was not applied. Furthermore, the electrically conductive paste is also applied at the positions where the connection portions 307 are to be formed. The magnetic paste is applied so as to fill the regions around the thus-formed non-magnetic portion 23, connection layer 308, and connection portions 307, and the applied magnetic paste is then dried. The above-described procedure is repeated so that the connection layer 308 comes to have a prescribed thickness (FIG. 3D).

Next, the third coil conductor 303 is formed by applying the electrically conductive paste on top of the non-magnetic portion 23. At this time, the terminating end of the third coil conductor 303 extends up to the connection layer 308 and is connected to the second coil conductor 302 via the connection layer 308. Furthermore, at the same time, the electrically conductive paste is also applied at the positions where the connection portions 307 are to be formed. The magnetic paste is applied so as to fill the regions around the third coil conductor 303 and the connection portions 307 and the magnetic paste is then dried. The above-described procedure is repeated so that the third coil conductor 303 comes to have a prescribed thickness (FIG. 3E). At this time, as illustrated in FIG. 3F, the length of the coil conductor layer that is formed last among the coil conductor layers constituting the third coil conductor 303 (that is, the coil conductor layer that will contact the non-magnetic layer 22) may be given a length that is different from the lengths of the other coil conductor layers. In the manufacturing example illustrated in FIGS. 3A to 3S, the length of the coil conductor layer that is formed last is made smaller than the lengths of the other coil conductor layers. Thus, the third coil conductor 303 is formed with the surrounding regions being filled with the magnetic layer 21.

The first coil 31 is formed in which the first to third coil conductors 301 to 303 are connected to each other via the connection layers 308 through the above-described procedure. In the manufacturing example illustrated in FIGS. 3A to 3S, the number of turns of the first coil is 2.5, but a multilayer coil array according to an embodiment of the present disclosure is not limited to this example and the number of turns may be appropriately changed as needed.

Next, the electrically conductive paste is applied at the positions where the connection portions 307 are to be formed and the non-magnetic layer 22 is formed by applying the magnetic paste in the region around the connection portions 307 (FIG. 3G). The process of applying and drying the electrically conductive paste and the non-magnetic paste is repeated so that the non-magnetic layer 22 comes to have a prescribed thickness.

Next, the second coil 32 is formed using the procedure described below. First, a fourth coil conductor 304 of the second coil 32 is formed by applying the electrically conductive paste onto the non-magnetic layer 22. Furthermore, the electrically conductive paste is also applied at the positions where the connection portions 307 are to be formed. The magnetic paste is applied so as to fill the regions around the fourth coil conductor 304 and the connection portions 307 and the magnetic paste is then dried. The above-described procedure is repeated so that the fourth coil conductor 304 comes to have a prescribed thickness (FIGS. 3H and 3I). At this time, as illustrated in FIG. 3H, the length of the coil conductor layer that is formed first among the coil conductor layers constituting the fourth coil conductor 304 (that is, the coil conductor layer that will contact the non-magnetic layer 22) may be given a length that is different from the lengths of the other coil conductor layers. In the manufacturing example illustrated in FIGS. 3A to 3S, the length of the coil conductor layer that is formed first is made smaller than the lengths of the other coil conductor layers. Thus, the fourth coil conductor 304 is formed with the surrounding regions being filled with the magnetic layer 21.

In the manufacturing example illustrated in FIGS. 3A to 3S, both the length of a coil conductor layer of the first coil 31 and the length of a coil conductor layer of the second coil 32 are made to be different from the lengths of the other coil conductor layers, but this configuration is not essential, and it would be sufficient for at least one out of the length of a coil conductor layer of the first coil 31 and the length of a coil conductor layer of the second coil 32 to be made different from the lengths of the other coil conductor layers.

Next, a non-magnetic portion 23 is formed by applying the non-magnetic paste onto the top of the fourth coil conductor 304 except for in a region where a connection layer 308, which is for forming a connection to a fifth coil conductor 305 of the second coil 32, is to be formed. Next, the connection layer 308 is formed by applying the electrically conductive paste onto the above-described region where the non-magnetic paste was not applied. Furthermore, the electrically conductive paste is also applied at the positions where the connection portions 307 are to be formed. The magnetic paste is applied so as to fill the regions around the thus-formed non-magnetic portion 23, connection layer 308, and connection portions 307, and the applied magnetic paste is then dried. The above-described procedure is repeated so that the connection layer 308 comes to have a prescribed thickness (FIG. 3J).

Next, the fifth coil conductor 305 is formed by applying the electrically conductive paste on top of the non-magnetic portion 23. At this time, the terminating end of the fifth coil conductor 305 extends up to the connection layer 308 and is connected to the fourth coil conductor 304 via the connection layer 308. Furthermore, at the same time, the electrically conductive paste is also applied at the positions where the connection portions 307 are to be formed. The magnetic paste is applied so as to fill the regions around the fifth coil conductor 305 and the connection portions 307 and the magnetic paste is then dried. The above-described procedure is repeated so that the fifth coil conductor 305 comes to have a prescribed thickness (FIG. 3K). Thus, the fifth coil conductor 305 is formed with the surrounding regions being filled with the magnetic layer 21.

Next, a non-magnetic portion 23 is formed by applying the non-magnetic paste onto the top of the fifth coil conductor 305 except for in a region where a connection layer 308, which is for forming a connection to a sixth coil conductor 306 of the second coil 32, is to be formed. Next, the connection layer 308 is formed by applying the electrically conductive paste onto the above-described region where the non-magnetic paste was not applied. Furthermore, the electrically conductive paste is also applied at the positions where the connection portions 307 are to be formed. The magnetic paste is applied so as to fill the regions around the thus-formed non-magnetic portion 23, connection layer 308, and connection portions 307, and the applied magnetic paste is then dried. The above-described procedure is repeated so that the connection layer 308 comes to have a prescribed thickness (FIG. 3L).

Next, the sixth coil conductor 306 is formed by applying the electrically conductive paste on top of the non-magnetic portion 23. At this time, the terminating end of the sixth coil conductor 306 extends up to the connection layer 308 and is connected to the fifth coil conductor 305 via the connection layer 308. Furthermore, at the same time, the electrically conductive paste is also applied at the positions where the connection portions 307 are to be formed. The magnetic paste is applied so as to fill the regions around the sixth coil conductor 306 and the connection portions 307 and the magnetic paste is then dried. The above-described procedure is repeated so that the sixth coil conductor 306 comes to have a prescribed thickness (FIG. 3M). Thus, the sixth coil conductor 306 is formed with the surrounding regions being filled with the magnetic layer 21.

The second coil 32 is formed in which the fourth to sixth coil conductors 304 to 306 are connected to each other via the connection layers 308 through the above-described procedure. In the manufacturing example illustrated in FIGS. 3A to 3S, the number of turns of the second coil 32 is 2.5, but a multilayer coil array according to an embodiment of the present disclosure is not limited to this example and the number of turns may be appropriately changed as needed.

The connection portions 307 are formed that lead the starting ends and the terminating ends of the first coil 31 and the second coil 32 out to the bottom surface of the element body 2 and connect the starting ends and the terminating ends of the first coil 31 and the second coil 32 to the outer electrodes once the prescribed number of coil conductors have been formed using the above-described procedure. The electrically conductive paste is applied at the positions where the connection portions 307 are to be formed and then dried. The magnetic paste is applied so as to fill the regions around the connection portions 307 and is then dried. The process of applying and drying the electrically conductive paste and the magnetic paste is repeated so that the connection portions 307 come to have a prescribed thickness (FIG. 3N). When the connection portions 307 are formed in this way, an additional non-magnetic layer may be formed by applying the non-magnetic paste instead of the magnetic paste in any of the layers among the plurality of layers of magnetic paste applied in the regions around the connection portions 307. There may be one or more such additional non-magnetic layers. The degree of insulation between a coil and the outer electrodes can be increased by providing an additional non-magnetic layer between the coil and the outer electrodes.

Figure 3R:
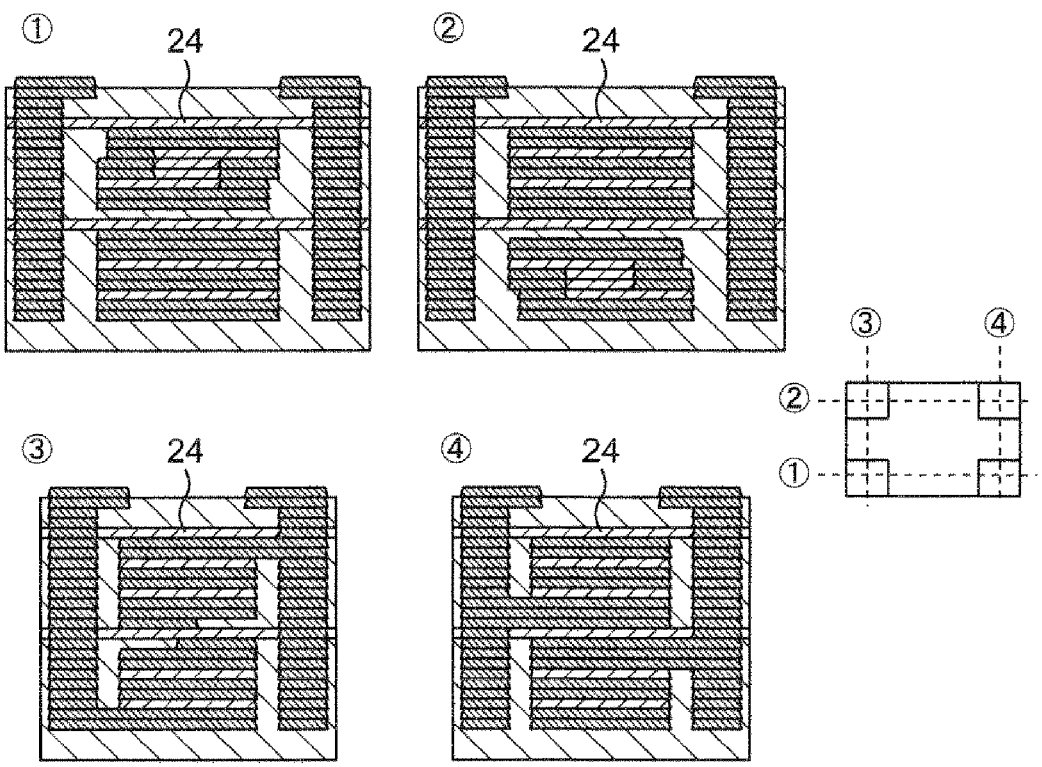
FIG. 3R is a schematic diagram for describing a modification of the method of manufacturing the multilayer coil array according to the embodiment of the present disclosure.
Figure 3S:
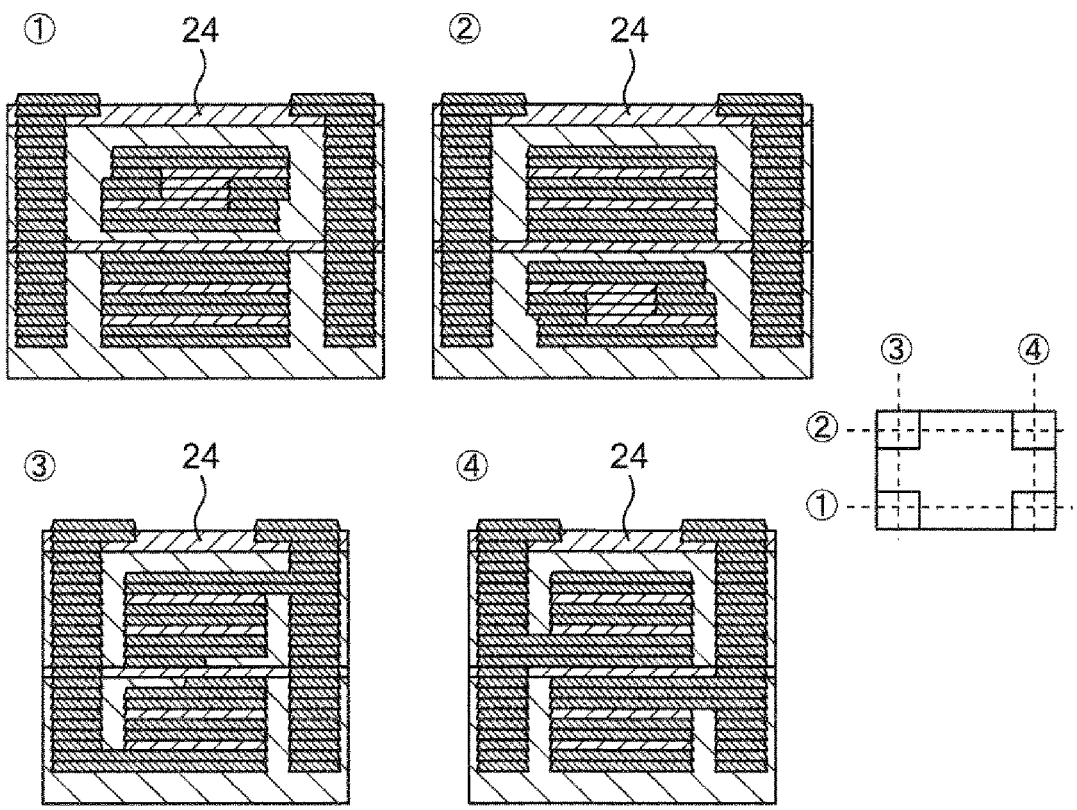
FIG. 3S is a schematic diagram for describing another modification of the method of manufacturing the multilayer coil array according to the embodiment of the present disclosure.

In one modification, as illustrated in FIG. 3R, an additional non-magnetic layer 24 may contact a coil conductor that faces the outer electrodes. When a coil conductor that faces the outer electrodes and an additional non-magnetic layer contact each other in this way, a direct-current superimposition characteristic of the multilayer coil array 1 can be further improved.

In another modification, as illustrated in FIG. 3S, the additional non-magnetic layer 24 may contact the outer electrodes. The direct-current resistance between the outer electrodes can be improved by providing the additional non-magnetic layer so that the additional non-magnetic layer contacts the outer electrodes.

In another modification, an additional non-magnetic layer may be provided at a position between a position where the additional non-magnetic layer would contact the coil conductor that faces the outer electrodes and a position where the non-magnetic layer would contact the outer electrodes. Improvement of the direct-current superimposition characteristic and improvement of direct-current resistance between the outer electrodes can be achieved in a well balanced manner by providing an additional non-magnetic layer at such a position.

A multilayer body inside of which a coil is formed and that includes a magnetic layer is prepared using the above-described procedure.

Next, the outer electrodes are formed. First, first outer electrode layers of the first outer electrode 401, the second outer electrode 402, the third outer electrode 403, and the fourth outer electrode 404 are formed by applying conductive paste onto a surface of the multilayer body obtained by the above-described procedure (FIG. 3O). The surface of the multilayer body on which the outer electrodes are formed is a surface that corresponds to a bottom surface of the element body. Four outer electrode patterns are formed by applying the electrically conductive paste so as to respectively cover the connection portions 307 exposed at the surface of the multilayer body and then the outer electrode patterns are dried.

Next, a magnetic paste layer or a non-magnetic paste layer is formed by applying a magnetic paste or a non-magnetic paste so as to cover at least part of an outer edge portion of each first outer electrode layer (FIG. 3P). At this time, the magnetic paste or non-magnetic paste is applied so as to fill the region surrounding the first outer electrode layers and then dried. In the example illustrated in FIG. 3P, a magnetic paste layer is formed. The degree of close contact between the element body and the outer electrodes can be improved by applying a magnetic paste or a non-magnetic paste in this way.

Next, second outer electrode layers of the first to fourth outer electrodes 401 to 404 are formed by applying a conductive paste onto the first outer electrode layers. The second outer electrode layers are formed so that part of each second outer electrode layer covers at least part of an outer edge portion of the magnetic paste layer or the non-magnetic paste layer (FIG. 3Q). The degree of close contact between the outer electrodes and the element body can be improved by forming the first to fourth outer electrodes 401 to 404 in this way. In addition, as a result of the second outer electrode layers being the outermost layers of the multilayer body, the outermost surfaces of the outer electrodes are located further toward the outside than the bottom surface of the element body at the bottom surface of the element body of the obtained multilayer coil array. Consequently, both improvement of the degree of close contact between the element body and the outer electrodes and improvement of contact at the time of mounting can be achieved for the obtained multilayer coil array.

In the manufacturing example illustrated in FIGS. 3A to 3S, the first to fourth outer electrodes 401 to 404 are formed by stacking two outer electrode layers (first outer electrode layer and second outer electrode layer), but a multilayer coil array according to an embodiment of the present disclosure and a manufacturing method therefor are not limited to this example, and the outer electrodes may instead be formed by stacking three or more outer electrode layers. In the case where n outer electrode layers are stacked (n is an integer greater than or equal to 3), a process of applying and then drying the electrically conductive paste and the magnetic paste or non-magnetic paste as described above is repeated n−1 times, and then finally the n-th outer electrode layer is formed by applying and then drying the conductive paste. Thus, the outermost surfaces of the outer electrodes are located further toward the outside than the bottom surface of the element body in the multilayer coil array obtained by stacking the layers such that the outermost layer of the multilayer body consists of the outer electrode layers.

The thus-obtained multilayer body is heated and separated from the metal plate, is then subjected to pressure bonding, and the PET film is then separated from the multilayer body. Thus, the multilayer body, which is an agglomeration of the element bodies, is obtained.

Next, the obtained multilayer body is divided into individual element bodies by performing cutting using a dicer. Corner portions of each divided multilayer body are rounded by subjecting the divided multilayer bodies to barrel processing. The barrel processing may be performed prior to firing the multilayer bodies or the barrel processing may be performed after the element bodies have been fired. The method used to perform the barrel processing may be a dry process or a wet process, a method in which the multilayer bodies rub against each other, or a method in which the multilayer bodies are barrel processed together with a medium.

Next, the barrel processed multilayer bodies are fired. The multilayer bodies are placed in a firing furnace and fired at a temperature of 650-750° C. and element bodies having the outer electrodes provided on the bottom surfaces thereof are thus obtained. The fired element bodies are immersed in a resin (such as epoxy resin) in a vacuum environment of 1 Pa or less and the insides of the element bodies are impregnated with the resin. The resin-impregnated element bodies are washed with a solvent (such as butyl carbitol acetate (2-(2-butoxyethoxy) ethyl acetate)), allowed to dry naturally, and then the resin is cured at a temperature of 100-200° C. After that, a Ni plating layer and a Sn plating layer are formed on the outer electrodes (base electrodes) formed on the surface of the element bodies by performing electroless plating. Thus, the multilayer coil array 1 illustrated in FIGS. 1A and 1B is obtained.

A method of manufacturing a multilayer coil array having two coils built into the inside of an element body thereof has been described above, but the multilayer coil array according to this embodiment may instead include three or more coils and in such a case, the multilayer coil array can be manufactured using a similar procedure to that described above. Furthermore, in the multilayer coil array according to this embodiment, the first coil 31 and the second coil 32 are each formed by connecting three coil conductors to each other, but each coil may instead be formed by connecting two coil conductors or four or more coil conductors to each other.

The present disclosure includes but is not limited to the following modes.

Mode 1

A multilayer coil array including an element body that includes a magnetic layer containing magnetic particles; a first coil and a second coil that are built into the element body; and a first outer electrode, a second outer electrode, a third outer electrode, and a fourth outer electrode that are provided on a surface of the element body and are respectively electrically connected to end portions of the first coil and the second coil. A non-magnetic layer is provided between the first coil and the second coil. The first coil and the second coil are each formed by a plurality of coil conductors being connected to each other in a stacking direction. At least one out of a coil conductor of the first coil that is closest to the second coil among the plurality of coil conductors of the first coil and a coil conductor of the second coil that is closest to the first coil among the plurality of coil conductors of the second coil contacts the non-magnetic layer. A length of a coil conductor layer that contacts the non-magnetic layer among coil conductor layers of the coil conductor that contacts the non-magnetic layer is different from a length of the other coil conductor layer(s).

Mode 2

The multilayer coil array according to mode 1, in which the length of the coil conductor layer that contacts the non-magnetic layer among the coil conductor layers of the coil conductor that contacts the non-magnetic layer is smaller than the length of the other coil conductor layer(s).

Mode 3

The multilayer coil array according to mode 1 or 2, in which a non-magnetic portion is provided in at least one place between adjacent coil conductors among the plurality of coil conductors of the first coil and the plurality of coil conductors of the second coil.

Mode 4

The multilayer coil array according to mode 3, in which the non-magnetic layer and the non-magnetic portion have the same composition.

Mode 5

The multilayer coil array according to mode 4, in which the non-magnetic layer and the non-magnetic portion are composed of a Zn—Cu ferrite.

A multilayer coil array according to an embodiment of the present disclosure can be used in a wide range of applications such as a DC-DC converter.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer coil array comprising:
an element body that includes a magnetic layer containing magnetic particles;
a first coil and a second coil that are built into the element body;
a first outer electrode, a second outer electrode, a third outer electrode, and a fourth outer electrode that are provided on a surface of the element body and are respectively electrically connected to end portions of the first coil and the second coil; and
a non-magnetic layer between the first coil and the second coil,
wherein
the first coil and the second coil are each formed by a plurality of coil conductors being connected to each other in a stacking direction,
at least one of
a coil conductor of the first coil that is closest to the second coil among the plurality of coil conductors of the first coil, and
a coil conductor of the second coil that is closest to the first coil among the plurality of coil conductors of the second coil
contacts the non-magnetic layer, and
a length of at least one of the at least one coil conductor that contacts the non-magnetic layer is different from a length of every coil conductor in the first and second coils that does not contact the non-magnetic layer,
wherein the length of the at least one of the at least one coil conductor that contacts the non-magnetic layer is smaller than the length of the every coil conductor in the first and second coils that does not contact the non-magnetic layer.

2. The multilayer coil array according to claim 1, wherein a non-magnetic portion is provided in at least one place between adjacent coil conductors among the plurality of coil conductors of the first coil and the plurality of coil conductors of the second coil.

3. The multilayer coil array according to claim 2, wherein the non-magnetic layer and the non-magnetic portion have the same composition.

4. The multilayer coil array according to claim 3, wherein the non-magnetic layer and the non-magnetic portion are composed of a Zn—Cu ferrite.

5. A multilayer coil array comprising:
an element body that includes a magnetic layer containing magnetic particles;
a first coil and a second coil that are built into the element body;
a first outer electrode, a second outer electrode, a third outer electrode, and a fourth outer electrode that are provided on a surface of the element body and are respectively electrically connected to end portions of the first coil and the second coil; and
a non-magnetic layer between the first coil and the second coil,
wherein
the first coil and the second coil are each formed by a plurality of coil conductors being connected to each other in a stacking direction,
at least one of
a coil conductor of the first coil that is closest to the second coil among the plurality of coil conductors of the first coil, and a coil conductor of the second coil that is closest to the first coil among the plurality of coil conductors of the second coil contacts the non-magnetic layer, and a length of at least one of the at least one coil conductor that contacts the non-magnetic layer is smaller than a length of every coil conductor in the first and second coils that does not contact the non-magnetic layer, wherein the magnetic layer is provided at a position where both ends of the coil conductor that contact non-magnetic layer are connected along a winding direction.

6. The multilayer coil array according to claim 5, wherein the length of the coil conductor that contacts the non-magnetic layer is different from the lengths of the other coil conductors that do not contact the non-magnetic layer.

* * * * *